United States Patent Office 3,732,175
Patented May 8, 1973

3,732,175
CROSSLINKING OF PHOSPHAZENE POLYMERS
Harry Rex Allcock, State College, Pa., assignor to The
Firestone Tire & Rubber Company, Akron, Ohio
No Drawing. Filed Sept. 27, 1971, Ser. No. 184,180
Int. Cl. C08g 33/16
U.S. Cl. 260—2 P     5 Claims

ABSTRACT OF THE DISCLOSURE

The crosslinking of poly(alkoxy- and aryloxy-)phosphazenes the skeletal chains of which consist of recurring units represented by the general formula

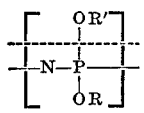

in which R and R' each represents alkyl, fluoralkyl or aryl or other monovalent units, is accomplished by a ligand exchange process involving an alkali metal salt of a fluorinated polyol.

---

This invention relates to the crosslinking of polyphosphazenes the skeletal chains of which consist of recurring units represented by the general formula

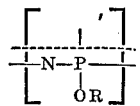

in which R and R' are as defined above.

Such polyphosphazenes are synthesized by reaction of polydichlorophosphazene $(NPCl_2)_x$ with sodium alkoxides or aryloxides or with fluorinated sodium alkoxides or aryloxides, as described, for example, in U.S. Pats. 3,370,-026; 3,271,330; 2,876,247, and more recently U.S. Pat. 3,515,688 issued June 2, 1970.

The rubbery or thermoplastic ploymers prepared by this route are uncrosslinked, a fact which limits the applicability of these materials.

The present invention is directed to the preparation of crosslinked polymers from the previously known uncrosslinked materials.

Briefly, crosslinked polymers having enhanced applicability, as compared with the uncrosslinked polymers, are prepared by a ligand exchange process utilizing a crosslinking agent represented by the formula $$(Z\text{—}OCH_2)_2(CF_2)_m$$

where in Z represents H or an alkali metal and $m$ represents a small integer. When Z is H a tertiary amine is used as a proton acceptor. The crosslinking agent is brought into contact with a solution of a polyphosphazene represented by the formula

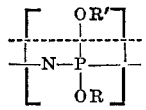

in which R and R' are as defined above.

In the case of an alkali metal salt of a fluorinated polyol, the reaction would be represented as follows:

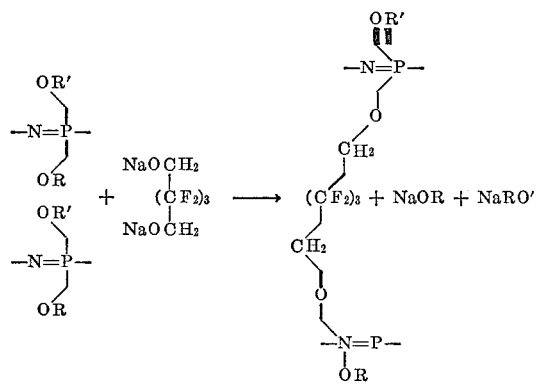

One such alkali metal salt of a dihydroxy compound represented by the general formula is

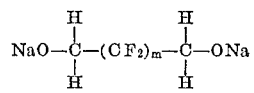

in which $m$ is a small integer, for example, 1 to 5. Similar alkali metal salts of tri- or other poly-hydroxy compounds could be used in the same ligand exchange process.

For reasons of convenience and economy, the sodium salt is preferred, but it is to be understood that other alkali metal salts, e.g., those of potassium, lithium, cesium and rubidium, may be used in place of the sodium salts.

Substantially equimolar amounts of reactants lead to extensive crosslinking. The crosslinking is applicable to either uncrosslinked polymers, as in the examples which follow, or to lightly crosslinked polymers.

Furthemore, if crosslinking of the polymer is carried out in other than the solid state, the choice of solvent or swelling agent for the polymer does not appear to be critical; ethers, ketones, esters and fluorocarbons may be used provided they do not impair the crosslinking agent.

Crosslinking in the solid state generally requires higher temperatures than solution crosslinking. The temperatures required are dependent on the nature of the salt and the type of polyol. Temperatures of 100° F. to 350° F. generally are required.

It is to be noted that selected fillers, plasticizers, and pigments may be present in the composition of this invention without altering the course of the crosslinking reaction.

The following examples will serve to further illustrate the invention and are not intended to limit the invention in any way.

EXAMPLE 1

To a stirred solution of poly[bis(trifluoroethoxy)phosphazene] $[NP(OCH_2CF_3)_2]_n$ (6.4 g., 0.026 mole/monomer unit) in dry tetrahydrofuran (50 ml.) at 25° C. was added a filtered solution of the disodium salt of 2,2,3,3,4,4-hexafluoro-1,5-pentane diol in tetrahydrofuran prepared from 2,2,3,3,4,4-hexafluoropentanediol (0.28 g., 0.0013 mole) and sodium (0.06 g., 0.0026 mole) in tetrahydrofuran (25 ml.). A viscosity increase occurred immediately and gelation took place within 10 minutes. Removal of the solvent yielded a polymer almost indistinguishable in appearance and flexibility from the uncrosslinked form.

Treatment of the uncrosslinked polymer with ten-times the amount of disodium hexafluoropentanedioxide (2.8 g., 0.013 mole) in tetrahydrofuran (30 ml.) yielded a rubbery conglomerate. Sodium trifluoroethoxide was extracted by prolonged treatment with tetrahydrofuran, and a leathery material was obtained after exhaustive drying.

The crosslinked polymers formed by this process swell in solvents such as tetrahydrofuran, but, unlike the precursor polymers, they do not dissolve. The degree of crosslinking is enhanced by increases in the ratio of diol to poly(organophosphazene), with the degree of swelling being correspondingly reduced. Extensive crosslinking is also accompanied by a change in the polymer properties from those of a flexible thermoplastic to a stiff, leathery material.

EXAMPLE 2

A solution of poly[bis(heptafluorobutoxy)phosphazene][NP(OCH$_2$C$_3$F$_7$($_2$)]$_n$ (1.0 g., 0.023 mole) in Freon TA solvent (50 ml.) was treated with a solution prepared from 2,2,3,3,4,4-hexafluoropentanediol (0.05 g., 0.00023 mole) and sodium (0.01 g., 0.00046 mole) in dry tetrahydrofuran (20 ml.). Precipitation occurred almost immediately and gelation and phase separation took place slowly during three days. The product was insoluble in Freon TA, but swelled by this solvent. Similar results were obtained when half the concentration of crosslinking agent was employed (5 mole percent).

Crosslinking did not occur in Example 1 when the disodium salt of ethylene glycol or the disodium salt of 1,4-butanediol was used in place of the disodium salt of hexafluoro-1,4-pentanediol. Hence it appears that the the crosslinking agent should be one represented by the formula

in which $n$ is 2 and $m$ is a small integer usually between 1 and 6 and Z represents an alkali metal or hydrogen. When Z is hydrogen, a tertiary amine is used as a proton acceptor.

I claim:
1. A ligand exchange process of crosslinking polyphosphazenes the skeletal chain of which consist of recurring units represented by the general formula:

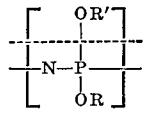

in which R and R' are each selected from the group consisting of alkyl, fluorosubstituted alkyl, and aryl, which process comprises:

treating said polyphosphazenes with a crosslinking agent which is a fluorinated polyol compound represented by the general formula:

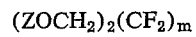

in which $m$ is a small integer from 1 to 6 and Z is selected from the group consisting of H and monovalent alkali metal cations, and recovering, the resulting crosslinked polymer.

2. The process of claim 1 wherein the crosslinking agent is an alkali salt of said fluorinated polyol.

3. The process of claim 2 wherein a solution of the phosphazene is brought into contact with said alkali metal salt.

4. The process of claim 1 in which the crosslinking agent is the disodium salt of 2,2,3,3,4,4-hexafluoropentane diol.

5. A crosslinked phosphazene polymer produced by the ligand exchanged process of claim 1.

References Cited

UNITED STATES PATENTS

| | | | |
|---|---|---|---|
| 3,194,787 | 7/1965 | Redfarn et al. | 260—47 |
| 3,271,330 | 9/1966 | Evans | 260—2 |
| 3,515,688 | 6/1970 | Rose | 260—2 |
| 3,524,907 | 8/1970 | Stockel et al. | 260—927 |
| 3,370,020 | 2/1968 | Allcock et al. | 260—2 |

FOREIGN PATENTS

| | | | |
|---|---|---|---|
| 1,351,940 | 12/1963 | France | 260—2 |

SAMUEL H. BLECH, Primary Examiner

U.S. Cl. X.R.

260—927 N